United States Patent
MacDuff

[15] 3,639,008
[45] Feb. 1, 1972

[54] POWER BRAKE SYSTEM
[72] Inventor: Stanley I. MacDuff, Daytona Beach, Fla.
[73] Assignee: The Bendix Corporation
[22] Filed: Feb. 9, 1970
[21] Appl. No.: 9,815

Related U.S. Application Data
[62] Division of Ser. No. 226,614, Sept. 27, 1962, Pat. No. 3,514,163.

[52] U.S. Cl. ..........................303/10, 60/54.5 P, 91/391 A, 188/106 P, 303/13, 303/49
[51] Int. Cl. .......................................................B60t 13/14
[58] Field of Search .................91/391 A; 60/54.5 P, 54.6 P; 188/106 P; 303/2, 10, 13, 49

[56] References Cited

UNITED STATES PATENTS

| | | | |
|---|---|---|---|
| 2,847,829 | 8/1958 | Gladden | 60/54.6 P |
| 2,925,805 | 2/1960 | Schultz | 60/54.6 P |
| 2,959,450 | 11/1960 | Gladden et al. | 60/54.6 P |
| 3,034,301 | 5/1962 | Vick | 60/54.6 P |
| 3,267,663 | 8/1966 | Schultz | 60/54.5 P |

Primary Examiner—Milton Buchler
Assistant Examiner—John J. McLaughlin
Attorney—William N. Antonis and Plante, Arens, Hartz, Smith & Thompson

[57] ABSTRACT

A braking system having a manually operated master cylinder for supplying the energizing force to activate the wheel brakes of a vehicle in the absence of power boost device being inoperative.

2 Claims, 1 Drawing Figure

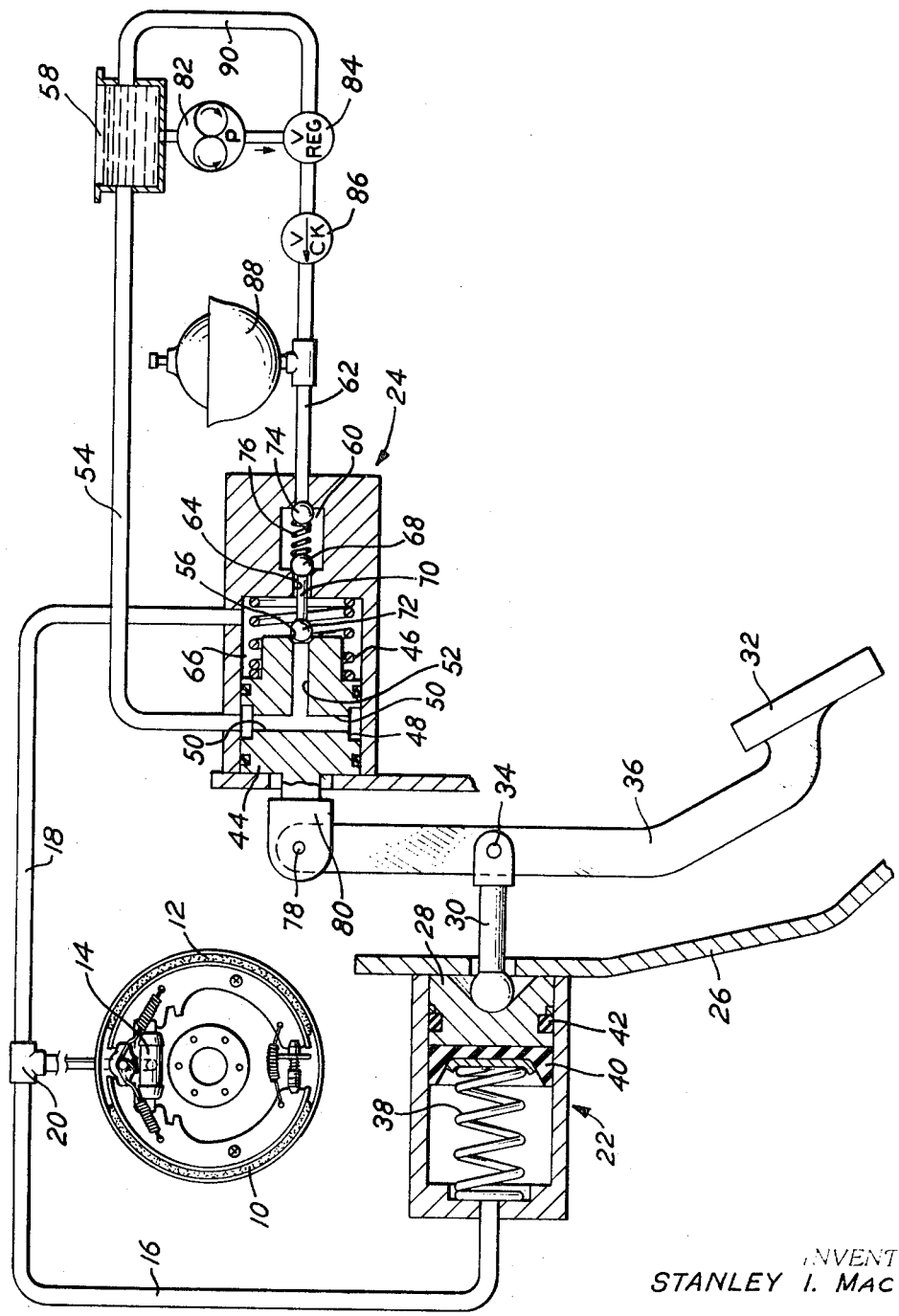

POWER BRAKE SYSTEM

This is a division of application Ser. No. 226,614 filed Sept. 27, 1962 and now U.S. Pat. No. 3,514,163, issued May 26, 1970.

This invention relates to a manual followup brake applicator for a full power braking system. In more detail, this invention discloses the addition of a manual brake cylinder to a full power braking system to allow manual brake actuation, if power braking does not provide the desired braking effect.

Previous attempts to provide the safety features of my invention have centered about mechanical connections of the master cylinder and brake pedal with automatic means for causing movement of the pedal to actuate a power brake valve, and about the combination of master cylinder and power brake valve, which combination has required pressure responsive devices biasing master cylinder pressure against power system pressure to determine which system is operative.

It is, therefore, an object of this invention to improve upon these safety devices by providing a mechanical safety connection between a power brake system and a conventional brake system.

It is also an object of my invention to provide a safety brake system which is instantaneously activated upon failure of an associated power braking system.

A further object is to simplify a fail-safe full power fluid brake system.

As may be readily appreciated by those skilled in the art other objects and features of my invention appear in the following specification relating to the accompanying drawings wherein:

In the drawing a schematic of a fail-safe full power fluid brake system designed in accordance with the present invention is shown.

In the drawing a conventional wheel braking system is shown having drum brake shoes 10 and 12 actuated by a wheel cylinder 14.

A pair of conduits 16 and 18 joined as at 20 with a "T" fitting, which "T" fitting leads to the wheel cylinder 14, connect the wheel cylinder to a master cylinder 22 and a power brake valve 24, respectively.

The master cylinder is shown fixedly mounted to the floorboard 26 of a vehicle, and a piston 28 is slidably mounted in the cylinder 22. The piston is operatively connected by a link 30 through the floorboard to a brake pedal 32, as by a pivotal connection 34 with the brake pedal lever 36. As may be readily observed by the schematic, the piston 28 is biased by spring 38 to an inactive position, and appropriate seals 40 and 42 are employed with piston 28 to prevent seepage of a braking fluid past the piston as it slides within cylinder 22.

The power brake valve is schematically shown, as being somewhat similarly arranged, by having a sliding valve body 44 or reaction plunger, as it may be termed. The valve body is slidably mounted and resiliently biased by a spring 46 to an inactive position. In more detail the valve body is provided with an annular land 48 that is connected by lateral passages 50 to an axial passage 52. The land 48 is positioned to afford communication of passage 52 and return line 54 when the valve body 44 is in the inactive position shown by the schematic, which communication is prevented by displacement of the valve body to the right, as viewed in the drawing. The passage 52 terminates in a valve seat 56, which seat is designed such as to allow return flow of braking fluid from wheel cylinder 14 to reservoir 58 through the valve body passages, when the valve is in the extreme left or inactive position as seen in the drawing. In addition, the valve 24 is provided with an additional cavity 60 that is connected with a pressure system through conduit 62. The cavity 60 is connected by a passage 64 to a cavity 66 in which the valve 44 is slidably mounted. The passage 64 is normally closed by a poppet valve 68 in cavity 60 that is connected by a stem 70 to another poppet valve 72 in cavity 66 to form a barbell-type valve. A ball check valve 74 allows the introduction of fluid from the pressure system mentioned into cavity 60, but a spring 76 is interposed with the ball check and poppet 68 such that fluid can only flow in one direction through cavity 60, namely towards the valve cavity 66. However, flow in this direction is also prevented until the valve 44 is moved to seat poppet 72 and urge poppet 68 to open. Also, as in the case of the master cylinder, the brake lever 36 is pivotally connected, as at 78, to a valve control rod 80.

The pressure system mentioned may comprise numerous devices. One such system is shown having a pump 82 drawing fluid from reservoir 58 and discharging it through a regulator valve 84, a check valve 86 and an accumulator 88 to a conduit 62 leading to the power brake valve 24. As may be seen, these units are connected by a number of conduits, and a conduit 90 allows a bypass flow from the regulating valve 84 to be returned to the reservoir 58.

In operation brake pedal depression, due to spring 38 being stronger than spring 46, causes the lever 36 to pivot about the connection 34 such that the master cylinder link 30 acts as a fulcrum. This depression moves the reaction plunger 44 closing the return through line 54 and opening the passage 64 to allow pressure fluid to be supplied to cavity 66 and thence to wheel cylinder 14. The accumulator pressure will then energize the wheel cylinder and also aid spring 38 to hold piston 28 inoperative in that the relationship of pressurized area of the valve 44 so that of piston 28 is such as to allow link 30 to continue as the brake pedal fulcrum.

Should the accumulator pressure be too low to provide the desired braking effect, additional depression of the brake pedal 32 will cause the valve 44 to bottom or reach the end of its travel. The valve control rod connection 78 then becomes the fulcrum point, and additional force on the brake pedal will result in compression of spring 38 by movement of piston 28 which pressurizes fluid therebehind to activate wheel cylinder 14. Fluid supplied by cylinder 22 cannot exhaust to the pressure system due to check valve 74.

In accordance with the statutes I have explained the construction and operation of one embodiment of my invention. However, I do not propose to be limited to such construction for the true scope and spirit of my invention is only detailed by the appended claims.

I claim:

1. A braking system having a power boost means for supplying an actuating force to operate the wheel brakes of a vehicle in response to an operator input force and a manual boost means for supplying the actuating force as an emergency backup during periods when the power boost means is inoperative, said braking system comprising:

a first housing having an internal chamber with an inlet port, an outlet port and a return port, said inlet port being connected to a source of fluid pressurized by said power boost means, said outlet port being connected by a conduit to the wheel brakes of the vehicle, said return port being connected to a reservoir in the power boost means, said first housing having an internal wall with an axial opening forming a cavity to separate the inlet port from the outlet port;

first flow control means located in said cavity adjacent said inlet port;

second flow control means located in said cavity adjacent said axial opening in the internal wall;

first resilient means located between said first and second flow control means for limiting the flow of said fluid under pressure from said power boost means to one direction by urging the first and second flow control means against the portion of the first housing surrounding the inlet port and axial opening;

first piston means located in said internal chamber having passageways connecting said chamber with said return port, said first piston means having a projection extending through said first housing;

third flow control means secured to said second flow control means and located adjacent one of said passageways in said first piston means;

said first resilient means in urging said second flow control means against the portion of the first housing surrounding the axial opening allowing free communication between said return port and said passageways in said first piston means to relieve any fluid pressure from said conduit;

lever means having one end pivotally secured to said projection of said first piston extending from the housing and the other end located in a position to receive said input force from the operator;

a second housing having a pressure responsive control chamber connected to the conduit from the outlet port of the first housing going to the wheel brakes;

second piston means located in said control chamber;

second resilient means for biasing said second piston means to a first inactive position; and link means connecting said second piston means to said lever means, said link means forming a fulcrum point about which said lever means pivots in response to an operator input force to cause said first piston to move initially contacting said third flow control means to close the communication through one of said passageways going to the return port and upon further movement opening said second flow control means to permit said fluid under pressure to flow out the outlet port, and through said conduit to activate the wheel brakes, said fluid under pressure in said conduit aiding said second resilient means in holding said second piston in the inoperative position.

2. The braking system as recited in claim 1, wherein the second resilient means and the fluid pressure in the conduit from the source are insufficient to maintain the second piston means inoperative and the fulcrum point through which said input force from the said lever will shift to the pivotal connection with said first piston means, said input force moving said second piston means in said control chamber to a second position to supply the activating force for operating the wheel brakes.

* * * * *